US007363629B2

(12) United States Patent
Springer, Sr. et al.

(10) Patent No.: US 7,363,629 B2
(45) Date of Patent: Apr. 22, 2008

(54) METHOD, SYSTEM, AND PROGRAM FOR REMOTE RESOURCE MANAGEMENT

(75) Inventors: James Alan Springer, Sr., Tucson, AZ (US); Thomas Charles Jarvis, Tucson, AZ (US); Gail Andrea Spear, Tucson, AZ (US); Sam Clark Werner, Tucson, AZ (US); Richard Kenneth Martinez, Tucson, AZ (US); Matthew Sanchez, Tucson, AZ (US); Theresa Mary Brown, Tucson, AZ (US)

(73) Assignee: International Business Machines Corporation, Armonk, NY (US)

( * ) Notice: Subject to any disclaimer, the term of this patent is extended or adjusted under 35 U.S.C. 154(b) by 653 days.

(21) Appl. No.: 10/465,177

(22) Filed: Jun. 19, 2003

(65) Prior Publication Data

US 2004/0260748 A1     Dec. 23, 2004

(51) Int. Cl.
G06F 9/46        (2006.01)
(52) U.S. Cl. .................. 719/314; 718/102; 718/105
(58) Field of Classification Search ................ 719/314; 718/102, 105
See application file for complete search history.

(56) References Cited

U.S. PATENT DOCUMENTS

| 5,450,555 | A | 9/1995 | Brown, III et al. | |
|---|---|---|---|---|
| 7,046,676 | B2 | 5/2006 | Goetzinger et al. | |
| 2003/0005025 | A1 | 1/2003 | Shavit et al. | |
| 2004/0024894 | A1* | 2/2004 | Osman et al. | 709/230 |
| 2004/0054853 | A1 | 3/2004 | Sprangie et al. | |
| 2004/0260773 | A1 | 12/2004 | Springer | |

OTHER PUBLICATIONS

Herlihy et al., Low contention load balancing on large-scale multiprocessors, ACM Symposium on Parallel Algorithms and Architectures, pp. 219-227, Year of Publication: 1992.*

(Continued)

*Primary Examiner*—William Thomson
*Assistant Examiner*—Phuong N Hoang
(74) *Attorney, Agent, or Firm*—William K. Konrad; Konrad Raynes & Victor LLP

(57) ABSTRACT

Provided are a method, system, and program for managing resources in which a local processor sends remote operation requests to be executed by a remote processor having multiple resources. In the illustrated embodiment, the local processor and the remote processor each have a resource manager, each of which maintains a control set for each resource of the remote processor. Each control set of the remote processor resource manager includes a queue for queuing remote operation requests awaiting execution in connection with the resource associated with the control set. Each control set of the local processor resource manager includes a credit counter which keeps track of permissible outstanding remote operation requests. Each local processor control set credit counter is decremented for each remote operation request for the associated resource sent to the remote processor and is incremented for each acknowledgment received from the remote processor. For each remote processor control set, the remote processor resource manager sends an acknowledgment for each remote operation request initiated in connection with the associated resource. For each local processor control set, the local processor resource manager queues remote operation requests if the control set credit counter falls below a threshold after being initialized in accordance with the capacity of the associated remote processor control set queue.

8 Claims, 9 Drawing Sheets

OTHER PUBLICATIONS

Wang et al., Load balancing policies in heterogeneous distributed systems, System Theory, 1994., Proceedings of the 26th Southeastern Symposium on, Mar. 20-22, 1994 pp. 473-477.*

U.S. Patent and Trademark Office communication mail date Jan. 18, 2007, U.S. Appl. No. 10/465,116, filed Jun. 19, 2003, by inventor James Alan Springer, SR.

* cited by examiner

US 7,363,629 B2

METHOD, SYSTEM, AND PROGRAM FOR REMOTE RESOURCE MANAGEMENT

RELATED APPLICATIONS

This application is related to copending application entitled METHOD, SYSTEM, AND PROGRAM FOR COMMUNICATION CODE CHANGES, assigned to the assignee of the present application, filed on Jun. 19, 2003.

BACKGROUND OF THE INVENTION

1. Field of the Invention

The present invention relates to a method, system, and program for managing resources of a remote processor.

2. Description of the Related Art

Computing systems often include one or more host computers ("hosts") for processing data and running application programs, direct access storage devices (DASDs) for storing data, and a storage controller for controlling the transfer of data between the hosts and the DASD. Storage controllers, also referred to as control units or storage directors, manage access to a storage space often comprised of numerous hard disk drives connected in a loop architecture, otherwise referred to as a Direct Access Storage Device (DASD). Hosts may communicate Input/Output (I/O) requests to the storage space through the storage controller.

To maintain availability in the event of a failure, many storage controllers known in the prior art provide redundant hardware clusters. Each hardware cluster comprises a processor complex, cache, non-volatile storage (NVS), such as a battery backed-up Random Access Memory (RAM), and separate power supply to provide connection paths to the attached storage. The NVS in one cluster backs up write data from the cache in the other cluster so that if one cluster fails, the write data in the cache of the failed cluster is stored in the NVS of the surviving cluster. After one cluster fails, all Input/Output (I/O) requests would be directed toward the surviving cluster. When both clusters are available, each cluster may be assigned to handle I/O requests for specific logical storage devices configured within the physical storage devices.

In performing these and other tasks, a cluster can not only execute operations locally using the capabilities of the local cluster itself, but can also make a request to have an operation executed on a remote cluster in the storage controller system. Since the capabilities of the remote cluster are typically limited, it is often desirable that the local cluster refrain from requesting too many remote operations which could result in the capabilities of the remote cluster being exceeded.

Various techniques have been proposed for limiting or "throttling" the requesting of remote operations on a remote cluster. One such technique allows only a single remote operation to proceed on the remote cluster. Once the remote cluster responds that the remote operation is complete, the local cluster is permitted to request another remote operation. As a consequence, the remote cluster handles a single remote operation at a time.

FIG. 1 shows an example of a multiple cluster system 10 comprising a first cluster 12 communicating with a second cluster 14 over a bus 16. In this example, an application program 18 operating under an operating system 20 of the first or local cluster 12 instructs a mail manager 22 to send a remote operation request to the second or remote cluster 14. The mail manager 22 folds the remote operation request into a mail message and stores the mail message containing the remote operation request in a memory area 24 of the remote cluster 14. The memory area 24 referred to in FIG. 1 as a "incoming mail queue" functions as a queue of mail messages, some of which include remote operations waiting to be executed.

Each remote operation is executed on the remote cluster 14. The remote cluster 14 has a mail manager 26 which examines the operation code of the remote operation in each mail message stored in the queue 24 in the order in which they are stored in the queue 24. Using the operation code, the mail manager 26 invokes the remote operation. Once the remote operation is initiated, the mail message entry is removed from the queue 24 and a mail message is sent back to the local cluster 12 indicating that an additional remote operation may be sent to the remote cluster 14.

The mail manager 22 of the local cluster 12 is kept apprised by the mail manager 26 of the remote cluster 14, of how many mail message entries remain in the queue 24 of the remote cluster 14. In one prior system, the mail manager has a counter 37 which keeps a count of the permissible number of mail messages which may be sent to the other cluster 14 and stored as entries in the incoming mail queue 24 before mail messages are removed from the queue 24. Thus, each count of the counter 37 may be thought of as a "credit" permitting the sending of a mail message to the other cluster 14.

The maximum count or credits of the counter 37 is equal to the total capacity or total number of entries of the incoming mail queue 24. As mail messages are sent to the other cluster 14, the credits of the counter 37 are decremented by the mail manager 22. The mail messages may include remote operation requests. As these and other mail messages are processed and removed from the incoming mail queue 24, the mail manager 26 so informs the mail manager 22 and the credits of the counter 37 are incremented. Once the capacity of the queue 24 is reached as indicated by the counter 37 indicating that all available credits have been used up, the mail manager 22 of the local cluster withholds sending new mail messages to the remote cluster queue 24 until additional credits are applied to the counter 37, indicating that slots have become available in the queue 24. In the meantime, the mail manager 22 stores remote operation requests and other mail in an outgoing mail queue 28 until the remote operation requests can be sent as mail messages to the remote cluster 14.

The second cluster 14 similarly has one or more application programs 38 operating under an operating system 40, which instructs the mail manager 26 to send a remote operation request to the first cluster 14 in the form of a mail message. The mail manager 26 stores the mail message containing the remote operation request as an entry in an incoming mail queue 44 of the first cluster 12. Operation of the remote operation request is invoked by the mail manager 22 of the first cluster 12. Once the incoming mail queue 44 of the first cluster 12 becomes full as indicated by a credit counter 46, the mail manager 26 of the second cluster 14 stores the mail messages in an outgoing mail queue 48 until additional space becomes available in the queue 44.

As previously mentioned, one purpose of redundant clusters is to ensure that if one cluster fails, the storage controller or other device may continue to operate. In such redundant applications, it is often desired that at least one cluster operate at all times so that operation of the device is not interrupted. As a result, when upgrading the software or code of the device, the software is often upgraded on one cluster while the other cluster continues to run. Then, the upgraded cluster is restarted and the software on the other cluster is upgraded. As a consequence, there may be intervals when the software code running the two clusters may be not be at the same level on both clusters. When the software on a cluster is upgraded and the cluster is restarted or booted, the booted cluster may inform the other cluster of the software level of the booted cluster. In one prior art system, this software level information may take the form of a version number of the loaded software.

SUMMARY OF THE DESCRIBED IMPLEMENTATIONS

Provided are a method, system, and program for managing resources in a remote processor in which remote operation requests are sent from a local processor to the remote processor. In one aspect, a remote operation request of a first resource type sent to a remote processor from a local processor, may be added as an entry in a first queue of remote operation requests of the first resource type awaiting execution by a first resource in a remote processor. Similarly, a remote operation request of a second resource type sent to the remote processor from the local processor, may be added as an entry in a second queue of remote operations of the second resource type awaiting execution by a second resource in a remote processor.

When execution of a remote operation request of the first resource type from the first queue is initiated using the resource of the first resource type of the remote processor, the remote operation request entry may be removed from the first queue. In addition, the remote processor may send to the local processor an acknowledgment that an additional remote operation request of the first resource type may be sent to the remote processor for execution.

Similarly when initiating execution of a remote operation request of the second resource type from the second queue using the resource of the second resource type of the remote processor; the remote operation request entry may be removed from the second queue. In addition, the remote processor may send to the local processor an acknowledgment that an additional remote operation request of the second resource type may be sent to the remote processor for execution.

In another aspect, upon sending a remote operation request of a first resource type to the remote processor to be executed in connection with a first resource type of the remote processor; the local processor may decrement a first count of credits for each remote operation of the first resource type sent to the remote processor. In addition, upon receiving an acknowledgment from the remote processor that another remote operation of the first resource type may be sent to the remote processor; the local processor may increment the first count of credits for each acknowledgment from the remote processor that another remote operation of the first resource type may be sent to the remote processor. Each credit may represent a permissible outstanding remote operation request.

Similarly, upon sending a remote operation request of a second resource type to the remote processor to be executed in connection with a second resource type of the remote processor, the local processor may decrement a second count of credits for each remote operation of the second resource type sent to the remote processor. In addition, upon receiving an acknowledgment from the remote processor that another remote operation of the second resource type may be sent to the remote processor; the local processor may increment the second count of credits for each acknowledgment from the remote processor that another remote operation of the second resource type may be sent to the remote processor.

In yet another aspect, if the first count of credits is below a predetermined threshold, the local processor may queue a remote operation request of the first resource type in a third queue of remote operation requests of the first resource type awaiting to be sent to the remote processor to be executed in connection with the first resource type of the remote processor. On the other hand, if the first count of credits is above a predetermined threshold, the local processor may send a remote operation request of the first resource type from the third queue to the remote processor to be executed in connection with the first resource type of the remote processor.

Similarly, if the second count of credits is below a predetermined threshold, the local processor may queue a remote operation request of the second resource type in a fourth queue of remote operation requests of the second resource type awaiting to be sent to the remote processor to be executed in connection with the second resource type of the remote processor. On the other hand, if the second count of credits is above a predetermined threshold, the local processor may send a remote operation request of the second resource type from the fourth queue to the remote processor to be executed in connection with the second resource type of the remote processor.

In still another aspect, the remote processor may increment a third count of credits for each initiation of execution of a remote operation of the first resource type and may decrement the third count of credits for each acknowledgment sent that an additional remote operation request of the first resource type may be sent to the remote processor for execution. Similarly, the remote processor may increment a fourth count of credits for each initiation of execution of a remote operation of the second resource type and may decrement the fourth count of credits for each acknowledgment sent that an additional remote operation request of the second resource type may be sent to the remote processor for execution.

In yet another aspect, if the third count of credits is below a predetermined threshold, the remote processor may delay sending the local processor an acknowledgment that an additional remote operation request of the first resource type may be sent to the remote processor for execution until the third count of credits is above a predetermined threshold. Similarly, if the fourth count of credits is below a predetermined threshold, delaying sending the local processor an acknowledgment that an additional remote operation request of the second resource type may be sent to the remote processor for execution until the fourth count of credits is above a predetermined threshold.

In still another aspect, the local processor may attach an operation code identifying the resource type of a remote operation request prior to sending a remote operation request to the remote processor. In addition, the remote processor may decode the operation code of a remote operation request upon receipt of the remote operation request by the remote processor to identify the resource type.

In another aspect, the first queue has a first maximum number of entries and the first count of credits has a first maximum which matches the first maximum number of entries of the first queue. Similarly, the second queue has a second maximum number of entries and the second count of credits has a second maximum which matches the second maximum number of entries of the second queue.

BRIEF DESCRIPTION OF THE DRAWINGS

Referring now to the drawings in which like reference numbers represent corresponding parts throughout.

DETAILED DESCRIPTION OF ILLUSTRATED EMBODIMENTS

In the following description, reference is made to the accompanying drawings which form a part hereof and which illustrate several embodiments of the present invention. It is understood that other embodiments may be utilized and structural and operational changes may be made without departing from the scope of the present invention.

Figure 2:
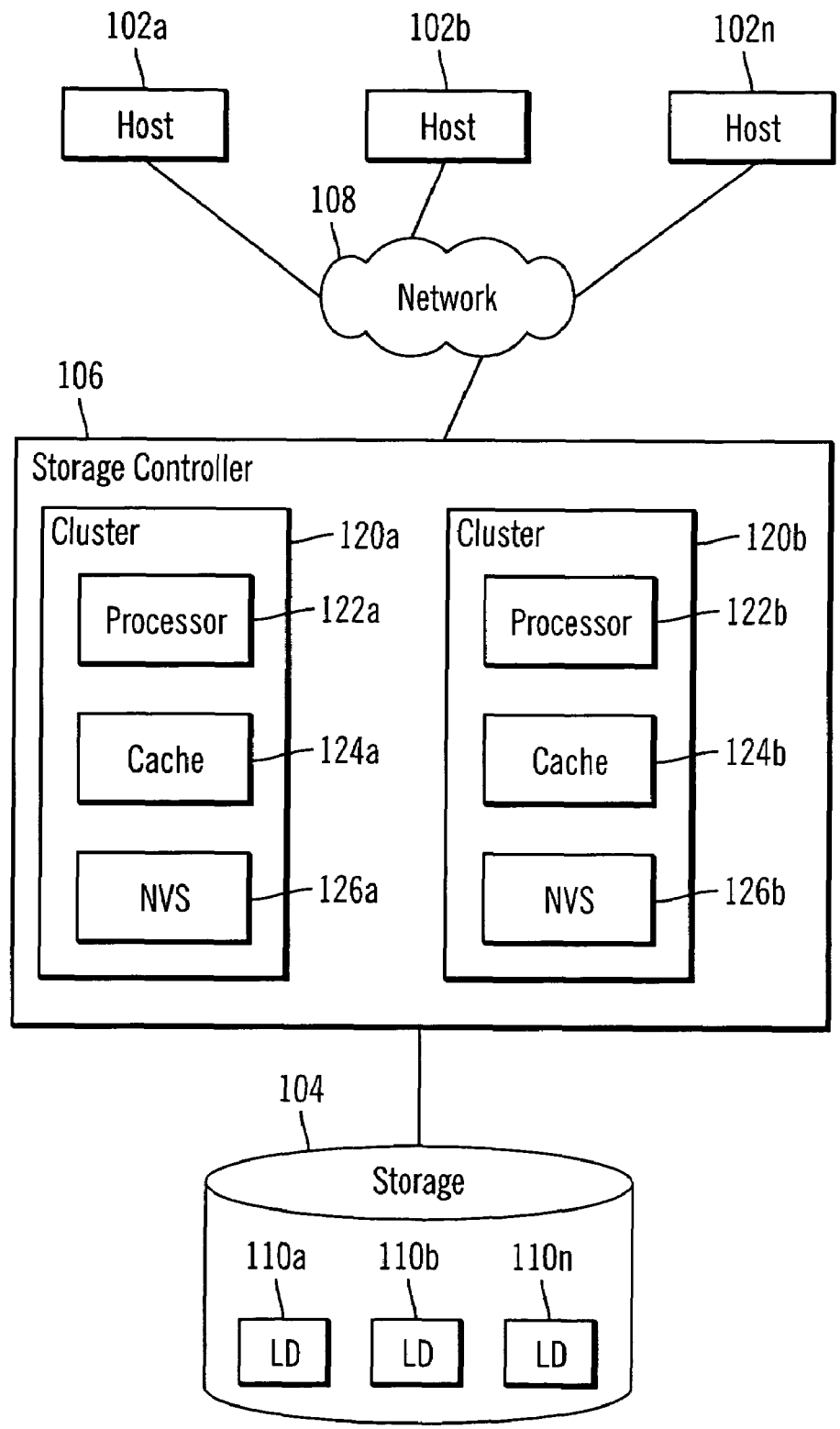
FIG. 2 illustrates an example of a computing environment in which aspects of the invention are implemented.

FIG. 2 illustrates a computing architecture in which aspects of the invention are implemented. One or more hosts 102a, 102b . . . 102n are in data communication with a storage system 104, such as a DASD or any other storage system known in the art, via a storage controller 106. The host 102 may be any computing device known in the art, such as a server, mainframe, workstation, personal computer, hand held computer, laptop, telephony device, network appliance, etc. The storage controller 106 and host system(s) 102 communicate via a network 108, which may comprise a Storage Area Network (SAN), Local Area Network (LAN), Intranet, the Internet, Wide Area Network (WAN), etc. The storage system 104 may be comprised of hard disk drives, tape cartridge libraries, optical disks, or any suitable non-volatile storage medium known in the art. The storage system 104 may be arranged as an array of storage devices, such as a Just a Bunch of Disks (JBOD), DASD, Redundant Array of Independent Disks (RAID) array, virtualization device, etc. The storage controller 106 may comprise any storage controller or server known in the art, such as the IBM Enterprise Storage Server (ESS) or any other storage controller known in the art. In certain implementations, the storage space in the storage controller 104 is configured as a plurality of logical devices (LD) 110a, 110b . . . 110n.

The storage controller 106 includes two separate clusters 120a, 120b of hardware components to provide redundancy for improved availability. Although the illustrated embodiment is described in connection with a storage controller having clusters, it is appreciated that the invention may be applicable to a variety of systems utilizing multiple processors in which one processor can direct operations to be executed by another processor.

Each cluster 120a, 120b of the illustrated embodiment may be maintained on a separate power boundary, and includes a processor complex 122a, 122b, a cache 124a, 124b, and a non-volatile storage unit (NVS) 126a, 126b. The NVS 126a, 126b may comprise a battery backed-up RAM or any other type of non-volatile or volatile backup cache used to backup data in cache. The hosts 102a, 102b . . . 102n would submit application I/O requests directed to a target logical device (LD) 110a, 110b . . . 110n, including write data, to the cluster 120a, 120b to which the target logical device (LD) 110a, 110b . . . 110n is assigned. The NVS 126a, 126b in one cluster 120a, 120b is used to backup write data in the cache 124b, 124a in the other cluster 120b, 120a, e.g., NVS 126a backs up write data in cache 124b.

In describing the logic of FIGS. 3-7, cluster 120a will be described as the local or sending cluster and cluster 120b as the remote or receiving cluster. Notwithstanding, the logic described in FIGS. 3-7 is capable of being executed by both processor complexes 122a, 122b in both clusters 120a, 120b in the storage controller 106 so that either cluster 102a, 102b may direct remote operations to be executed using the resources of the other.

Figure 3A:
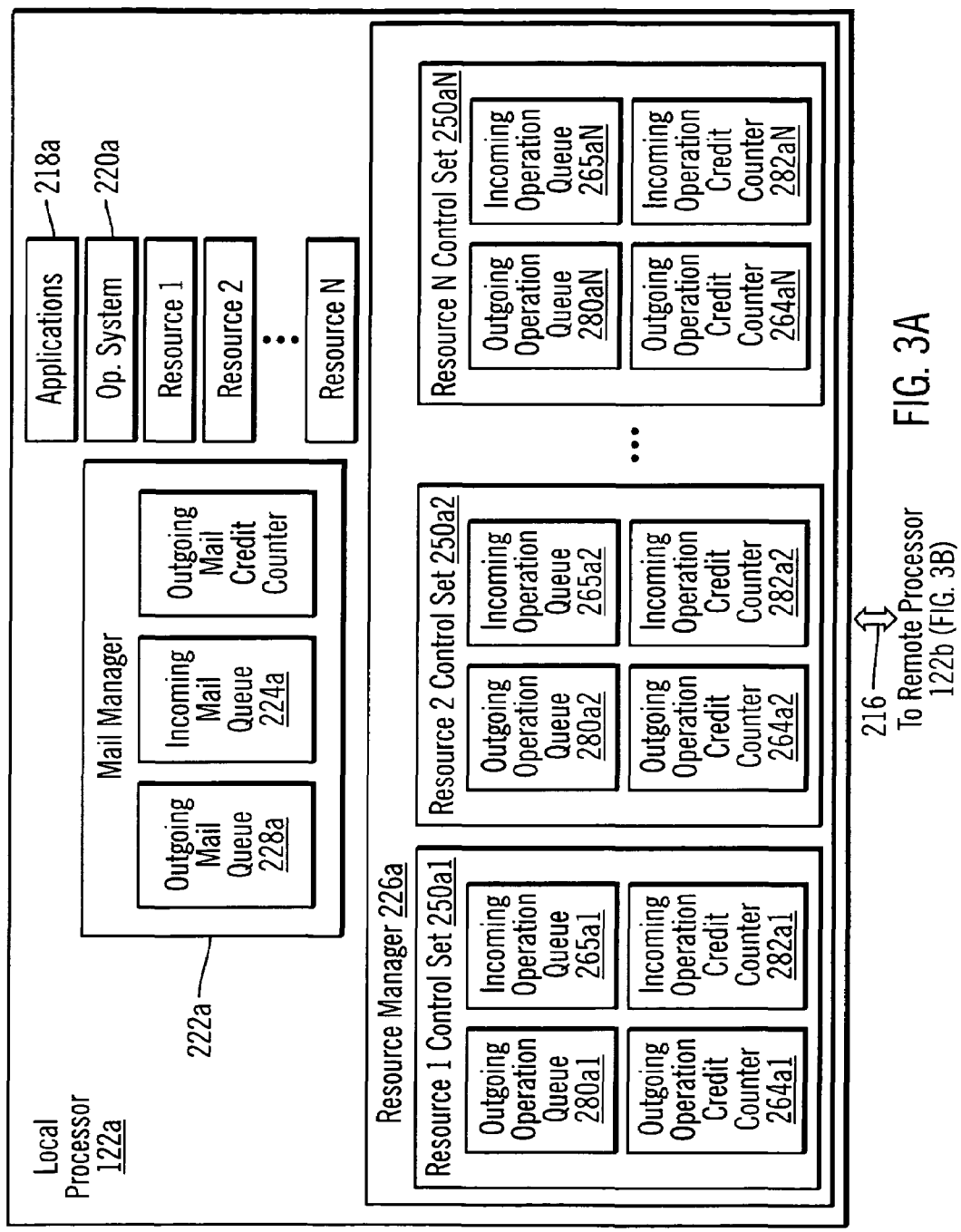
FIGS. 3A-3B illustrate an architecture of a remote operation manager of first and second processors utilized with implementations of the invention.
Figure 3B:
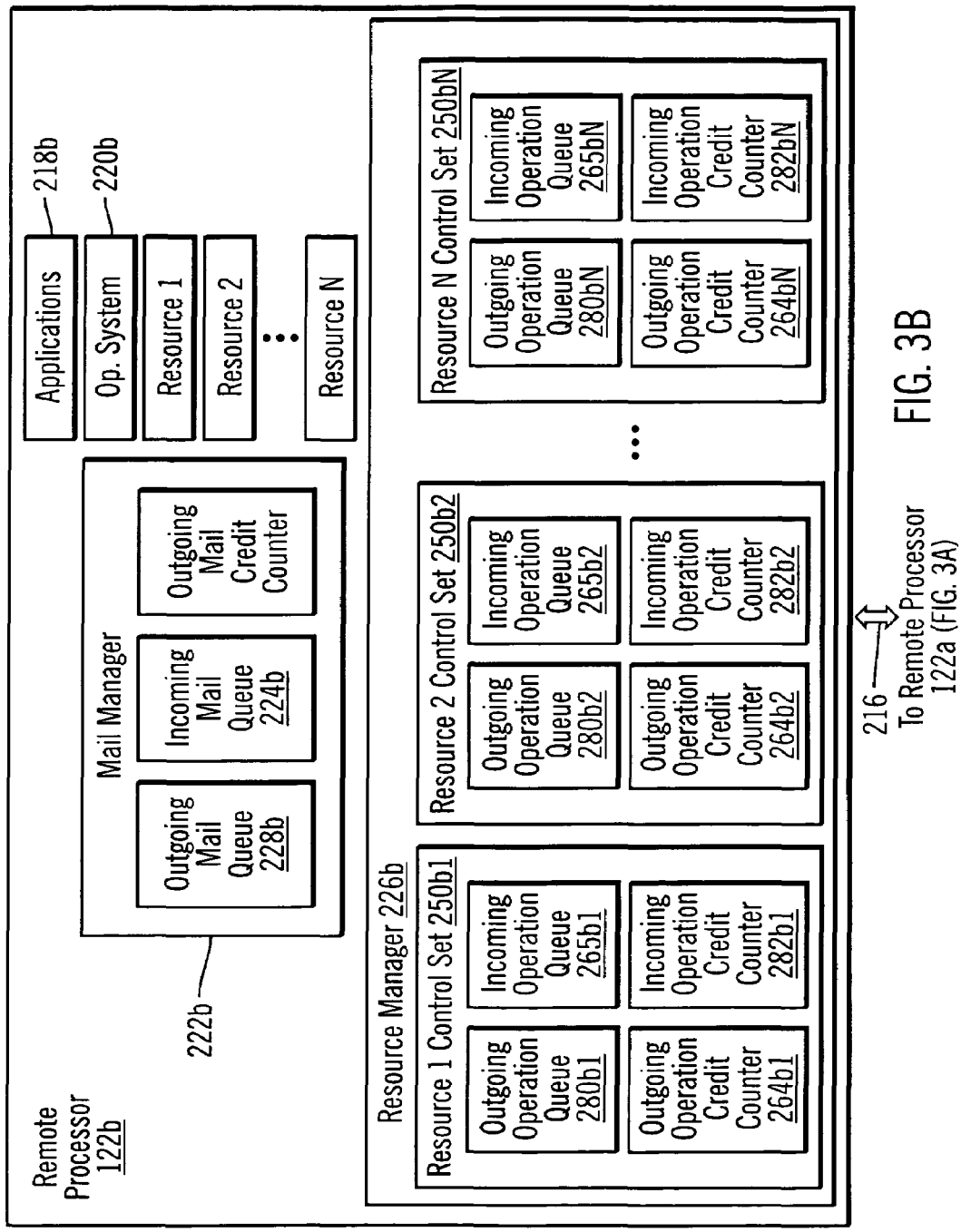

FIGS. 3A and 3B shows an example of the processor complex 122a communicating with the second processor complex 122b over a bus 216. In this example, each processor complex 122a, 122b has an application program 218a, 218b operating under an operating system 220a, 220b, which instructs a mail manager 222a, 222b to send a remote operation request to the other processor complex 122a, 122b. Each mail manager 222a, 222b has an incoming mail queue 224a, 224b and operates in a manner similar to the mail managers 22, 42 of FIG. 1. Thus, the mail manager 222a. stores the remote operation request of the processor complex 122a as an entry in the incoming mail queue 224b of the other processor complex 122b. Once the capacity of the incoming mail queue 224b is reached, the mail manager 222a of the processor complex 122a stores remote operation requests in an outgoing mail queue 228a until the remote operation requests can be sent to the other processor complex 122b. The other mail manager 222b similarly stores the remote operation request of the processor complex 122b as an entry in the incoming mail queue 224a of the other processor complex 122a. Once the capacity of the incoming mail queue 224a is reached, the mail manager 222b of the processor complex 122b stores remote operation requests in an outgoing mail queue 228b until the remote operation requests can be sent to the other processor complex 122a. It is appreciated that other mail type arrangements may be used to send operations from one processor to another processor for execution by the other processor.

In the illustrated embodiment, each processor complex 122a, 122b has a plurality of resources, resource 1, resource 2 . . . resource N, each resource being used in connection with the execution of operations. For example, each resource may be a type of Task Control Blocks, each of which acts as a "ticket" which permits a task to proceed. However, it is appreciated that a resource may be any finite item which is dynamically allocated and which is used to initiate, continue or complete an operation. Also, in some embodiments, the processor complexes may have only one type of resource.

In addition, each processor complex 122a, 122b has a resource manager 226a, 226b which manages the appropriate resource 1, resource 2 . . . or resource N of the processor complex which permits an operation to be initiated by that resource. In the illustrated embodiment, the resource manager 226a includes a control set 250a1, 250a2 . . . 250aN for each type of resource, that is, resource 1, resource 2 . . .

resource N, it is managing of the processor complex 122a. In a similar manner, the resource manager 226b includes a control set 250b1, 250b2 . . . 250bN for each type of resource, that is, resource 1, resource 2 . . . resource N it is managing of the processor complex 122b. Thus, for example, resource1 of processor complex 122a has associated with it control set 250a1 of resource manager 226a. As explained in greater detail below, such an arrangement permits the resource managers 226a, 226b to manage multiple types of resources without reference to the details of the type of resources it is allocating.

Figure 4:
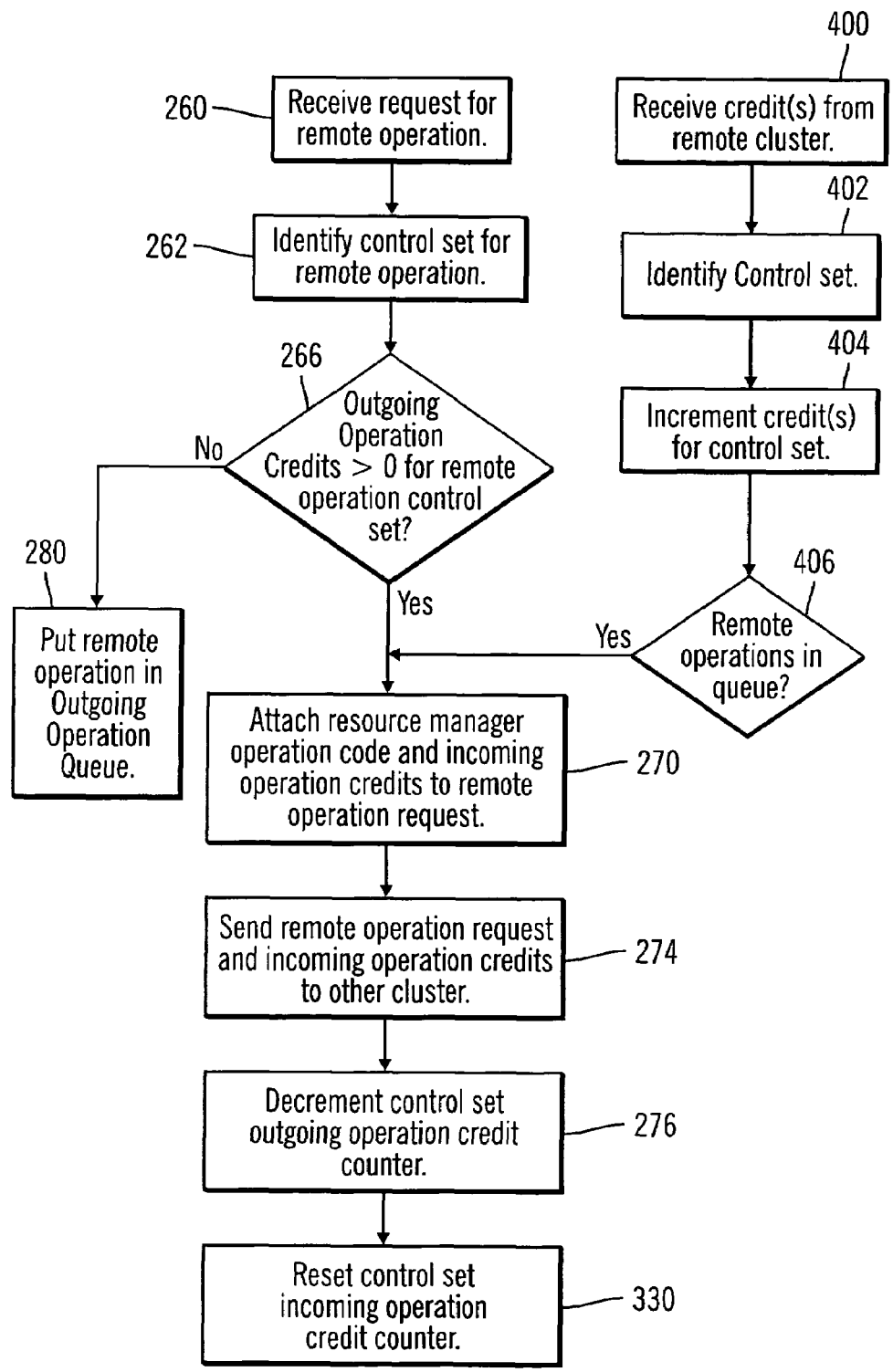
FIGS. 4-5 illustrate logic to manage resources between processors in accordance with implementations of the invention.

FIG. 4 illustrates operations of the resource manager 226a when an application 218a of the processor complex 122a requests execution of a remote operation by the other processor complex 122b. To request a remote operation, an application 218a invokes the resource manager 226a which receives (block 260) the request for the remote operation. The resource manager 226a identifies (block 262) which of the resources, resource 1-resource n, of the processor complex 122b is needed to execute the requested remote operation.

The resource manager 226a uses the appropriate control set 250a1 . . . 250aN for the identified resource 1-resource N to determine whether the remote operation can be sent to the remote processor complex 122b for execution or the sending of the remote operation should be delayed. Each control set 250a1-250aN keeps a count of the permissible outstanding remote operations for that resource in an outgoing operation counter 264a1-264aN. The maximum possible count for each control set 250a1-250aN represents the maximum number of remote operations that can be sent to the other processor complex 122b without exceeding the available capacity of the associated resource 1-resource N.

In the illustrated embodiment, each control set 250b1-250bN of the other processor complex 122b has an incoming operation queue 265b1-265bN in which remote operations may be queued if the particular resource associated with the control set is not available to initiate the remote operation. Each incoming operation queue 265b1-265bN of the other processor complex 122b has a predetermined capacity for storing remote operations awaiting initiation. The maximum count of the outgoing operation credit counter 264a1-264aN of each control set 250a1-250aN of the processor complex 122a corresponds to the capacity of the counterpart incoming operation queue 265b1-265bN of the other processor complex 122b. Thus, the count of permissible remote operations can be thought of as "credits" in which the resource manager 226a is permitted to send a remote operation to be executed in connection with an associated resource of the other processor complex 122b for each credit stored on the associated counter 264a1-264aN of the identified control set 250a1-250aN.

When the count permits, that is, when the number of credits remaining as indicated by the outgoing operation credit counter 264a1-264aN is greater than zero (block 266), the remote operation is sent (blocks 270-274) to the other processor complex 122b of the remote cluster 120b. The count of the associated outgoing operation credit counter 264a1-264aN is then decremented (block 276). Thus, the count of the appropriate credit counter 264a1-264aN is decremented as remote operations are sent to the other processor complex 122b. Once the count of the credit counter 264a1-264aN reaches zero (block 266), the capacity of the counter part incoming operation queue 265b1-265bN may be exceeded if another remote operation is sent to that queue. Accordingly, the resource manager 226a queues (block 280) the remote operation as an entry in the associated outgoing operation queue 280a1-280aN of the control set 250a1-250aN. As explained in greater detail below, the remote operation will remain in the queue 280a1-280aN until an outgoing operation credit becomes available for the associated control set 250a1-250aN. The outgoing operation credits are incremented as remote operations are completed on the remote processor complex 122b as described in connection with FIG. 5 below.

If, for example, a requested remote operation is to be executed in connection with resource 1 of the remote processor complex 122b, the resource manager 226a identifies (block 262) control set 250a1 for the resource 1 and checks the outgoing operation counter 264a1 of the control set 250a1. When the number of credits remaining as indicated by the outgoing operation credit counter 264a1 is greater than zero (block 266), the remote operation is sent (blocks 270-274) to the other processor complex 122b of the remote cluster 120b and the outgoing operation credit counter 264a1 is decremented (block 276). Otherwise, the resource manager 226a queues (block 280) the remote operation as an entry in the associated outgoing operation queue 280a1 of the control set 250a1 until a credit for control set 250a1 becomes available.

Although the illustrated embodiment utilizes a threshold of zero credits for delaying the sending of additional remote operation requests to the other processor complex, it is appreciated that other thresholds may be selected, depending upon the particular application.

In the illustrated embodiment, the resource managers 226a sends a remote operation request to the other processor complex 122b by placing the requested remote operation in a mail message and embedding (block 270) a resource manager operation code into the mail message. In addition, as explained below, the resource manager notes the count indicated by an incoming operation credit counter 282a1-282aN and embeds this count along with the resource manager operation code into the mail message. This mail message is passed (block 274) to the mail manager 222a which stores it in the incoming mail queue 224b of the mail manager 228b of the processor complex 122b. Upon passing the mail message containing the remote operation request to the mail manager 222a, the resource manager 226a decrements (block 276) the associated outgoing operation credit counter 264a1-264aN of the identified control set 250a1-250aN associated with the resource of resource 1-resource N which will execute the requested remote operation.

Figure 5:
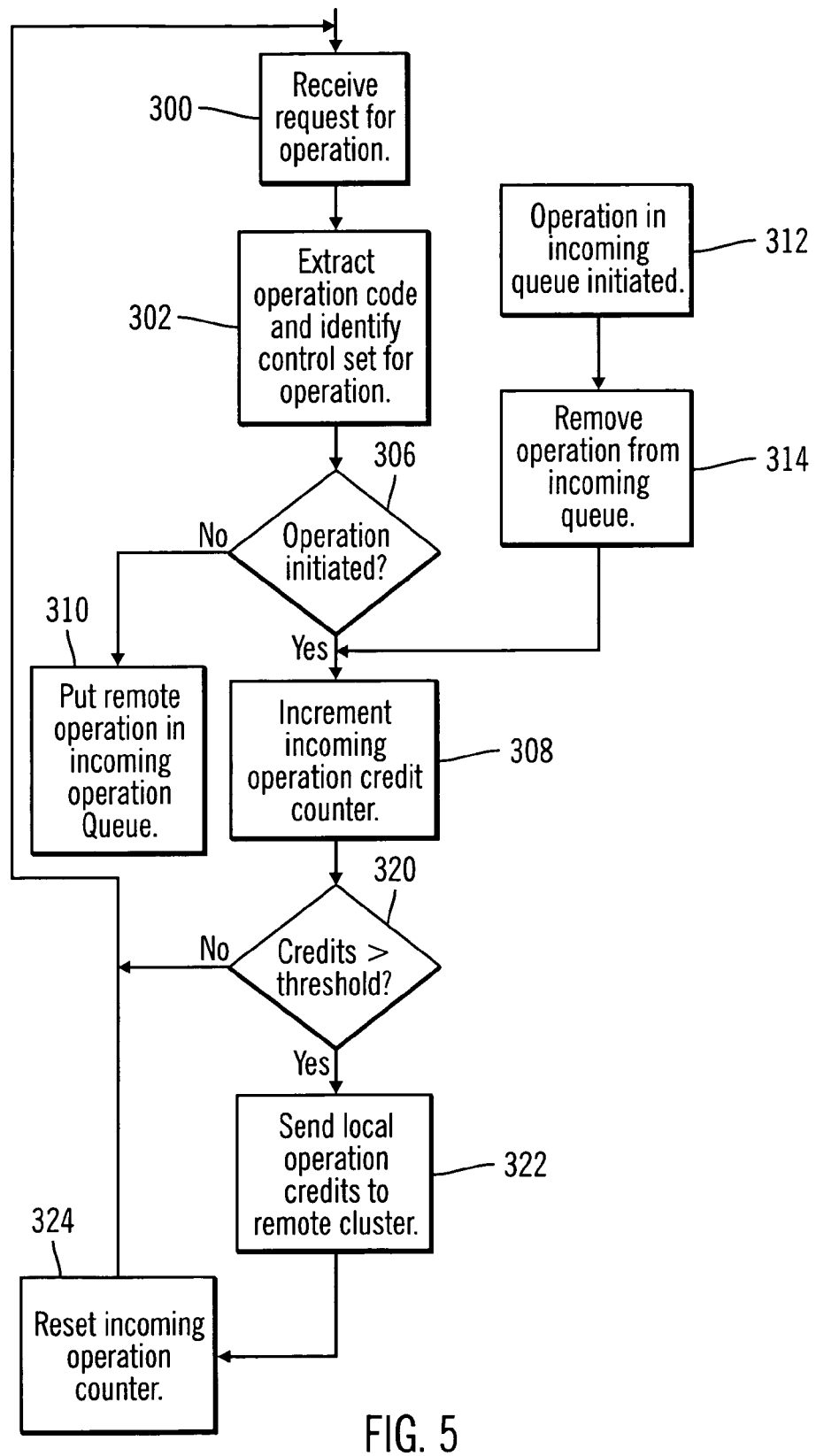

In a similar manner, FIG. 4 illustrates operations of the resource manager 122b when an application 218b of the processor complex 122b requests execution of a remote operation by the other processor complex 122a. Thus, each control set 250b1-250bN of the resource manager 122b includes an outgoing operation credit counter 264b1-264bN to keep track of permissible outstanding remote operations for each associated resource 1-resource N of the other processor complex 122a. Each control set 250b1-250bN includes an outgoing operation queue 280b1-280bN to store requested remote operation requests until a credit becomes available to send the remote operation request to the other processor complex 122a. Each control set 250b1-250bN still further includes an incoming operation credit counter 282b1-282bN described below. 100411 FIG. 5 illustrates operations of the resource manager 226b when a request for a remote operation is received (block 300) from the other processor complex 122a. As previously mentioned, the mail manager 222a of the processor complex 122a writes the mail message containing the requested remote operation as an entry in the incoming mail queue 224b of the mail manager 222b of the processor complex 122b. The mail manager 222b reads the resource manager operation code embedded in the mail message by the resource manager 226a of the processor complex 122a as described above, and informs the resource manager 226b of the processor complex 122b by passing a pointer to the mail message entry to the resource manager 226b. In response, the resource manager 226b extracts (block 302) the requested operation from the mail message and identifies the control set of the control sets 250b1-250bN which is associated with the particular resource, resource 1-resource N, needed to execute the requested remote operation in the mail message.

If the requested operation is successfully initiated (block 306), that is the resource of resource 1-resource N was available for the requested operation, processor complex 122b is ready for the processor complex 122a to send another remote operation request for that particular resource 1-resource N. Hence, an incoming operation credit counter 282b1-282bN of the identified control set 250b1-250bN is incremented (block 308), to indicate that another remote operation may be sent by the processor complex 122a.

If on the other hand, the requested operation was not initiated (block 306) because the resource could not be allocated to initiate the requested remote operation, the operation is placed (block 310) as an entry in the incoming operation queue 265b1-265bN of the identified control set. The incoming operation credit counter 282b1-282bN of the identified control set 250b1-250bN is not incremented because a slot of the incoming operation queue 265b1-265bN was used to store the queued remote operation. However, the resource manager 226a may continue to send remote operation requests for that resource1-resourceN so long as there are credits indicated by the associated outgoing operation credit counter 264a1-264aN as described above until the credits are used up, indicating that the associated incoming operation queue 265b1-265bN is filled to capacity.

Once the associated resource of the resources 1-N can be allocated, the first remote operation in the incoming operation queue 265a1-265aN to be executed in connection with that resource 1-resource N is initiated (block 312) and removed (block 314) from the incoming operation queue 265a1-265aN. The incoming operation credit counter 282b1-282bN of the identified control set 250b1-250bN may then be incremented (block 308) as described above to indicate that another remote operation request may be sent by the other processor complex 122a.

The processor complex 122a may be informed of the availability of additional credits in a variety of manners. In the illustrated embodiment, the resource manager 226b compares (block 320) the accumulated credit count as indicated by the particular incoming operation credit counter 282b1-282bN of the identified control set 250b1-250bN to a particular threshold and if the accumulated credits exceed this threshold, the resource manager sends (block 322) the credit information to the processor complex 122a in a mail message via the mail manager 222b. Each credit sent to the processor complex 122a is an acknowledgment that a remote operation request has been successfully initiated. In addition, the particular incoming operation credit counter 282b1-282bN is reset (block 324) to await the accumulation of further credits as incoming operations are initiated. If the accumulated credits do not exceed (block 320) this threshold, the incoming operation credits are permitted to continue to accumulate as indicated by the incoming operation credit counter 282b1-282bN of the identified control set 250b1-250bN.

Once the resource manager 226b is ready to send a remote operation request to the other processor 122a using the same identified control set 250b1-250bN, the resource manager 226b attaches (block 270, FIG. 4) the credit information of the incoming operation credit counter 282b1-282bN of the identified control set 250b1-250bN to the mail message containing the remote operation before it is sent. In addition, the incoming operation credit counter 282b1-282bN of the identified control set 250b1-250bN is reset (block 330).

If, for example, a requested remote operation is to be executed in connection with resource 1 of the remote processor complex 122b, the resource manager 122b extracts (block 302) the requested operation from the mail message and identifies the control set 250b1 which is associated with the resource 1 needed to execute the remote operation of the mail message. If the requested operation is successfully initiated (block 306), that is the resource 1 was available for the requested operation, processor complex 122b is ready for the processor complex 122a to send another remote operation request for resource1. Hence, an incoming operation credit counter 282b1 of the identified control set 250b1 is incremented (block 308), to acknowledge when sent, that another remote operation may be sent by the processor complex 122a.

If on the other hand, the requested operation was not initiated (block 306) because the resource 1 could not be allocated to initiate the requested remote operation, the operation is placed (block 310) in the incoming operation queue 265b1 of the identified control set 250b1. The incoming operation credit counter 282b1 of the identified control set 250b1 is not incremented because a slot of the incoming operation queue 265b1 was used to store the queued remote operation. However, the resource manager 226a may continue to send remote operation requests for that resource1 so long as there are credits indicated by the associated outgoing operation credit counter 264a1 as described above until the credits are used up, indicating that the incoming operation queue 265b1 is filled to capacity.

Once the associated resource 1 can be allocated, the first remote operation in the incoming operation queue 265a1 to be executed in connection with resource 1 is initiated (block 312) and removed (block 314) from the incoming operation queue 265a1. The incoming operation credit counter 282b1 of the identified control set 250b1 may then be incremented (block 308) as described above to indicate that another remote operation request may be sent by the other processor complex 122a for resource 1.

The resource manager 226b compares (block 320) the accumulated credit count as indicated by the incoming operation credit counter 282b1 of the identified control set 250b1 to a particular threshold and if the accumulated credits exceed this threshold, the resource manager sends (block 322) the credit information to the processor complex 122a in a mail message via the mail manager 222b. In addition, the incoming operation credit counter 282b1 is reset (block 324) to await the accumulation of further credits as incoming operations are initiated. If the accumulated credits do not exceed (block 320) this threshold, the incoming operation credits are permitted to continue to accumulate as indicated by the incoming operation credit counter 282b1 of the identified control set 250b1.

Once the resource manager 226b is ready to send a remote operation request for resource 1 to the other processor 122a using the same identified control set 250b1, the resource manager 226b attaches (block 270, FIG. 4) the credit information of the incoming operation credit counter 282b1 of the identified control set 250b1 to the mail message containing the remote operation before it is sent. In addition, the incoming operation credit counter 282b1 of the identified control set 250b1 is reset (block 330).

FIG. 5 likewise illustrates operations of the resource manager 226a when a request for a remote operation is received from the other processor complex 122b or when a requested remote operation queued in one of the incoming operation queues 265a1-265aN is initiated.

FIG. 4 also illustrates operations of the resource manager 226a when credit information is received (block 400) from the other processor complex 122b. The resource manager 226a identifies (block 402) the control set 250a1 . . . 250aN to which the credits from the other processor complex 122b apply. The resource manager 226a applies (block 404) the received credits to the outgoing operation credit counter 264a1-264N of the identified control set 250a1 . . . 250aN. Each applied credit increments the counter 264a1-264aN and thus will permit the resource manager 226a to send another remote operation to the other processor complex 122b where each remote operation is executed in connection with the associated resource of resource 1-resource N of the identified control set 250a1 . . . 250aN. If (block 406) there is a remote operation request in the associated outgoing operation queue 260b1-260bN, that remote operation request is sent (blocks 270-330) to the other processor complex 122b for execution. Control returns to block 260 and any remaining queued remote operation requests are sent until the credits of the associated outgoing operation credit counter 264a1-264aN are used up. At which time, the resource manager 226a awaits the receipt of additional credits from the other processor complex 122b to permit any remaining queued remote operation requests for the control set 250b1-250bN to be sent. FIG. 4 likewise illustrates operations of the resource manager 226b when credit information is received from the other processor complex 122a.

As previously mentioned, when upgrading the software or code of a device or system having multiple clusters, the software is often upgraded on one cluster while the other cluster continues to run. Then, the upgraded cluster is restarted and the software on the other cluster is upgraded. As a consequence, there may be intervals when the software code running the two clusters may be not be at the same level on both clusters.

Figure 6A:
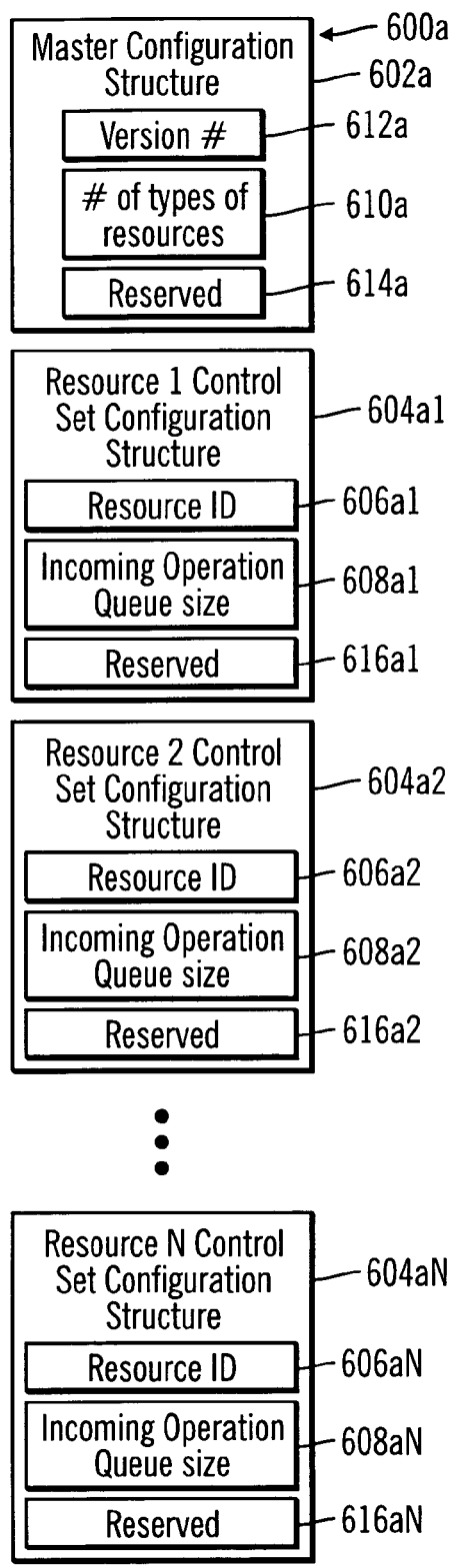
FIGS. 6A-6B each illustrate information in a remote operation manager configuration structure in accordance with implementations of the invention.
Figure 6B:
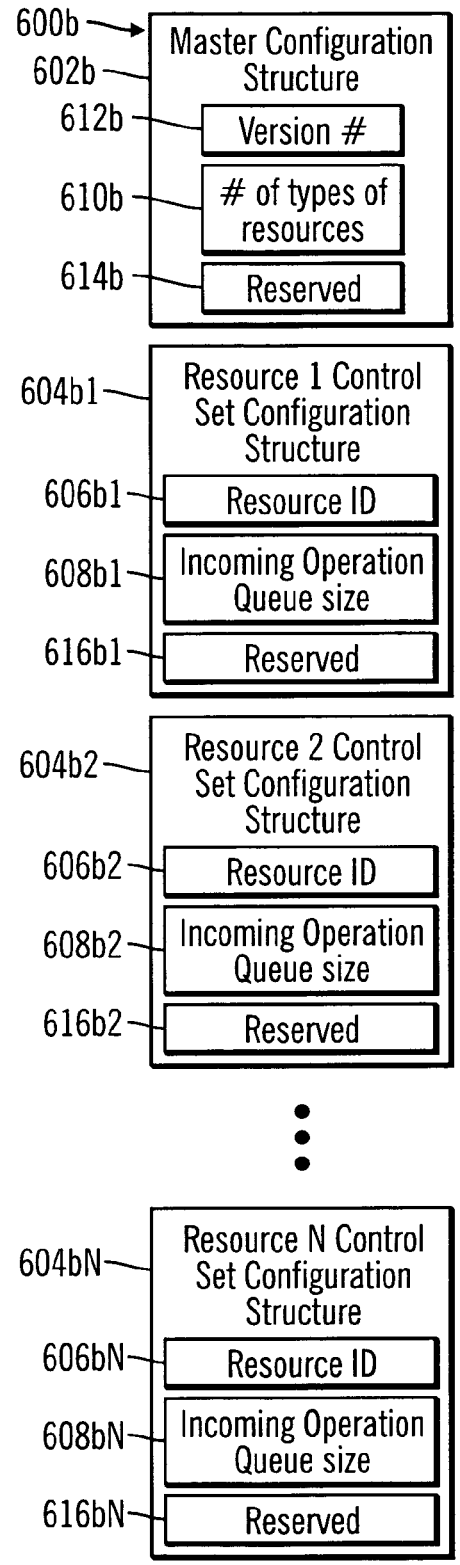

FIG. 6a shows an array 600a of configuration structures and FIG. 6b shows an array 600b of configuration structures which, as described in greater detail below, facilitate changes being made to the resource managers 226b and 226a, respectively, in a concurrent code load environment. The array 600a includes a master configuration structure 602a and a plurality of control set configuration structures 604a1, 604a2 . . . 604aN for configuring the resource manager 226b of the processor complex 122b. Similarly, the array 600b includes a master configuration structure 602b and a plurality of control set configuration structures 604b1, 604b2 . . . 604bN for configuring the resource manager 226a of the processor complex 122a.

More specifically, the array 600b of configuration structures 602b, 604b1-604bN contains information about the control sets 250b1, 250b2 . . . 250bN of the resource manager 226b of the processor complex 122b. In many applications it is desirable that the sending and receiving clusters agree on how many outstanding remote operation requests that the receiving cluster can accept for each resource1-resourceN. Thus, where the cluster 120b is to be the receiving cluster, the resource manager 226b of the processor complex 122b populates the configuration structure 600b with this information and passes the array 600b to the cluster that will be sending the remote operation requests, that is, the cluster 120a, via the mail manager 222b (FIG. 3B). When received, the resource manager 226a of the processor complex 122a extracts the configuration information from the array 600b and configures the control sets 250a1, 250a2 . . . 250aN of the resource manager 226a of the processor complex 122a to send the remote operation requests for each resource1-resourceN.

In the illustrated embodiment, the array 600b includes one resource control set configuration structure 604b1-604bN for each resource control set 250b1-250bN of the resource manager 226b. Each resource configuration structure 604b1-604bN contains information about its associated resource control set 250b1-250bN of the resource manager 226b which is used to configure the associated resource control set 250a1-250aN of the resource manager 226a. More specifically, each resource configuration structure 604b1-604bN includes a resource ID field 606b1-606bN which identifies the resource control set 250b1-250bN of the processor complex 122b, to which that particular configuration structure pertains. In addition, each resource configuration structure 604b1-604bN includes an incoming operation queue size field 608b1-6068N which specifies the size of the incoming operation queue 265b1-265bN of the resource control set 250b1-250bN identified by the field 606b1-606bN. The master configuration structure 602b contains a field 610b which identifies how many resource control set configuration structures 604b1-604bN the array 600b has and hence how many resource control sets 250b1-250bN the resource manager 226b has.

The master configuration structure 602b also contains a field 612b which identifies the version of the software code of the resource manager 226b. In addition, the master configuration structure 602b has a plurality of reserved fields 614b which reserve space for configuration information for future versions of control sets. Each resource configuration structure 604b1-604bN similarly has plurality of reserved fields 616b which provide similar capabilities.

Figure 7:
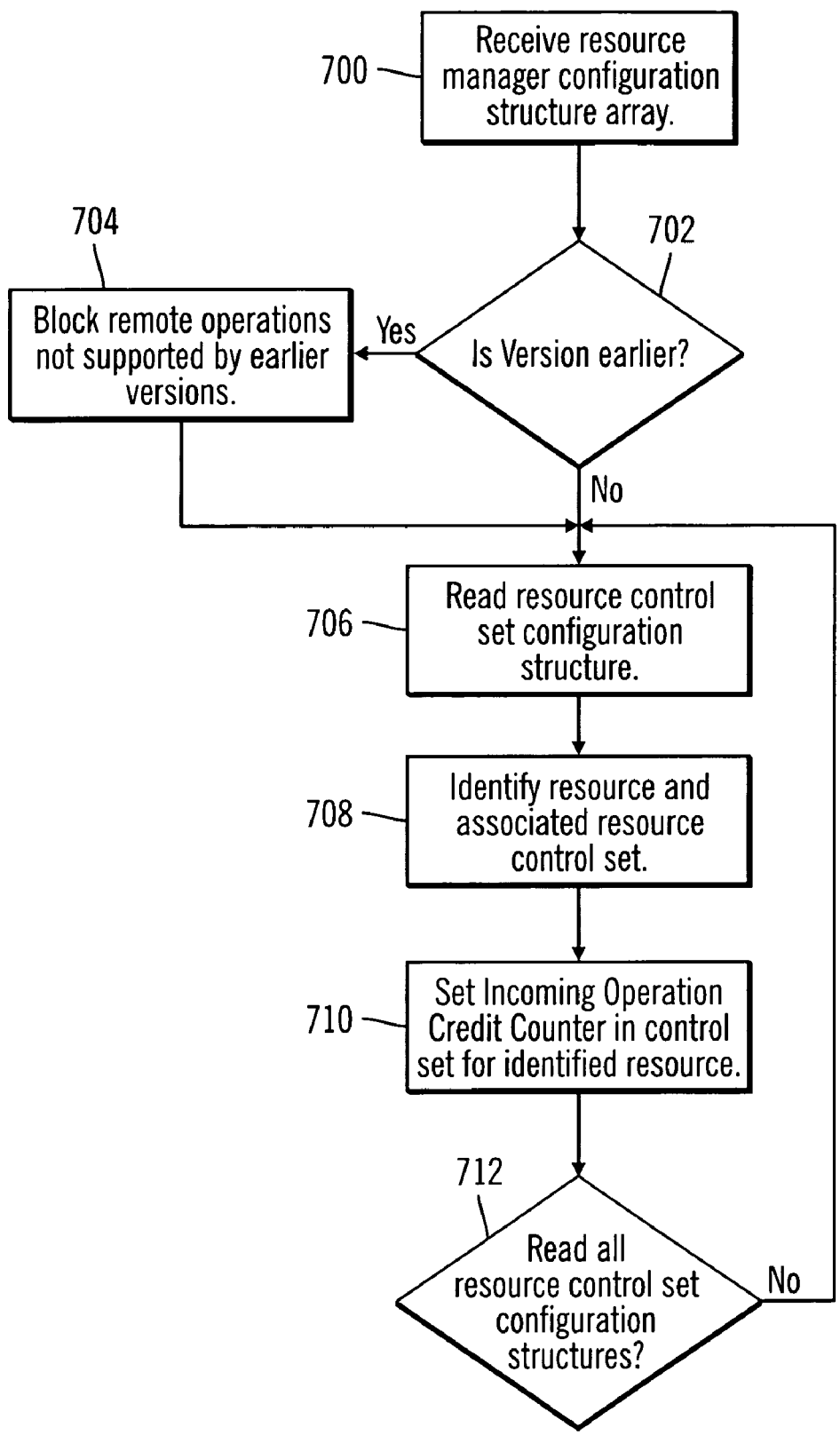
FIG. 7 illustrates logic to configure a remote operation manager in accordance with implementations of the invention.

FIG. 7 illustrates operations of the resource manager 226a of the processor complex 122a of the remote operation sending cluster 120a in extracting the configuration information from the configuration structure array 600b sent to the cluster 120a by the resource manager 226b of the remote operation receiving cluster 120b. Upon receipt (block 700) of the configuration structure 600b from the cluster 120b, the resource manager 226a of the cluster 120a examines (block 702) field 612b of the master configuration structure 602b and compares the version of the software code of the resource manager 226b of the cluster 120b to the version of the software code of the resource manager 226a of the cluster 120a. If the version of the software code of the resource manager 226b of the remote operation receiving cluster 120b is earlier than the version of the software code of the remote operation sending cluster 120a, the resource manager 226a of the cluster 120a blocks (block 704) the sending of remote operation requests to the other cluster 120b which may not be supported by the receiving cluster 120b.

After reading the master configuration structure 602b, the resource manager 226a reads (block 706) a resource control set configuration structure 604b1-604bN of the array 600b. From the read resource control set configuration structure 604b1-604bN, the resource manager 226b examines (block 708) field 606b1-606bN to identify the resource of resource1-resourceN to which the configuration information contained in the particular resource control set configuration structure 604b1-604bN which was read pertains. The resource manager 226a also identifies the resource control set of control sets 250a1-250aN for that identified resource or allocates a control set if one has not already been allocated. The incoming operation credit counter 282a1-282aN of the identified resource control set 250a1-250aN is set (block 710) so that the initial count of the counter 282a1-282bN matches the incoming operation queue size of the counterpart resource control set 250b1-250bN of the receiving cluster 120b.

Thus, for example, if the field 606b1 of the first resource control set configuration structure read (block 706) identifies (block 708) the control set 250b1 with associated with resource 1, the queue size read (block 710) from the field 608b1 is the size of the incoming operation queue 265b1 of the resource 1 control set 250b1 of the resource manager 226b of the receiving cluster 120b. Thus, the size of the queue 265b1 is used to initialize the count of the incoming operation credit counter 282a1 of the resource 1 control set 250a1. As a consequence, the resource manager 226a of the remote operation sending cluster 120a will limit the number of outstanding remote operation requests sent to the receiving cluster 120b to be executed in connection with resource 1 of the cluster 120b, such that the capacity of the incoming operation queue 265b1 of the receiving cluster 120b for remote operation requests of the resource 1 type will not be exceeded.

The resource manager 226a determines (block 712) whether all of the resource control set configuration structures 604b1-604bN of the array 600b have been read. This may be determined, for example, by comparing the number of control set configuration structures 604b1-604bN read to the number of control set configuration structures 604b1-604bN sent to the resource manager 226a as indicated by the field 610b of the master configuration structure 602b of the array 600b. Each remaining control set configuration structure 604b1-604bN is read and the counterpart resource control set 250a1-250aN is configured using the information read from the read control set configuration structure 604b1-604bN until all of the control set configuration structures 604b1-604bN of the array 600b have been read.

The resource identification fields 606b1-606bN readily permit the resource control set configuration structures 604b1-604bN to be sent by the receiving cluster 102b to the remote operation sending cluster 102a in any order. In addition, the aforementioned fields and array structure facilitate changes to the resource manager control sets. However, it is appreciated that one or more fields may be modified or eliminated and the configuration structures modified, depending upon the particular application.

In a similar manner, the array 600a of configuration structures 602a, 604a1-604aN contains information about the control sets 250a1, 250a2 . . . 250aN of the resource manager 226a of the processor complex 122a. Where the cluster 120a is to be the remote operation receiving cluster, the resource manager 226a of the processor complex 122a populates the configuration structure 600a with this information and passes the array 600a to the cluster that will be sending the remote operation requests, that is, the cluster 120b, via the mail manager 222a (FIG. 3A). When received, the resource manager 226b of the processor complex 122b extracts the configuration information from the array 600a and configures the control sets 250b1, 250b2 . . . 250bN of the resource manager 226b of the processor complex 122b to send the remote operation requests for each resource1-resourceN.

In the illustrated embodiment, the array 600a includes one resource control set configuration structure 604a1-604aN for each resource control set 250a1-250aN of the resource manager 226a. Each resource configuration structure 604a1-604aN contains information about its associated resource control set 250a1-250aN of the resource manager 226a which is used to configure the associated resource control set 250b1-250bN of the resource manager 226b. More specifically, each resource configuration structure 604a1-604aN includes a resource ID field 606a1-606aN which identifies one of the resource control sets 250a1-250aN of the processor complex 122a. In addition, each resource configuration structure 604a1-604aN includes an incoming operation queue size field 608a1-6068N which specifies the size of the incoming operation queue 265a1-265aN of the identified resource control sets 250a1-250aN. The master configuration structure 602a contains a field 610a which identifies how many resource control set configuration structures 604a1-604aN the array 600a has and hence how many resource control sets 250a1-250aN the resource manager 226a has.

The master configuration structure 602a also contains a field 612a which identifies the version of the software code of the resource manager 226a. In addition, the master configuration structure 602a has a plurality of reserved fields 614a which reserve space for configuration information for future versions of control sets. Each resource configuration structure 604a1-604aN similarly has plurality of reserved fields 616a which provide similar capabilities.

FIG. 7 also illustrates operations of the resource manager 226b of the processor complex 122b of the remote operation sending cluster 120b in extracting the configuration information from the configuration structure array 600a sent to the cluster 120b by the resource manager 226a of the remote operation receiving cluster 120a.

ADDITIONAL IMPLEMENTATION DETAILS

The described techniques for managing resources may be implemented as a method, apparatus or article of manufacture using standard programming and/or engineering techniques to produce software, firmware, hardware, or any combination thereof. The term "article of manufacture" as used herein refers to code or logic implemented in hardware logic (e.g., an integrated circuit chip, Programmable Gate Array (PGA), Application Specific Integrated Circuit (ASIC), etc.) or a computer readable medium, such as magnetic storage medium (e.g., hard disk drives, floppy disks, tape, etc.), optical storage (CD-ROMs, optical disks, etc.), volatile and non-volatile memory devices (e.g., EEPROMs, ROMs, PROMs, RAMs, DRAMs, SRAMs, firmware, programmable logic, etc.). Code in the computer readable medium is accessed and executed by a processor complex. The code in which preferred embodiments are implemented may further be accessible through a transmission media or from a file server over a network. In such cases, the article of manufacture in which the code is implemented may comprise a transmission media, such as a network transmission line, wireless transmission media, signals propagating through space, radio waves, infrared signals, etc. Thus, the "article of manufacture" may comprise the medium in which the code is embodied. Additionally, the "article of manufacture" may comprise a combination of hardware and software components in which the code is embodied, processed, and executed. Of course, those skilled in the art will recognize that many modifications may be made to this configuration without departing from the scope of the present invention, and that the article of manufacture may comprise any information bearing medium known in the art.

In the described implementations, certain operations were described as performed by the processor complexes 122a, and 122b. In alternative implementations, certain operations described as performed by the processor complexes may be performed by a variety of computers, processors, and controllers.

In described implementations, certain operations were described as incrementing and decrementing counters. It is appreciated that the "counts" of counters may be positive or negative and that "incrementing" or "decrementing" a count can make an actual count more negative or more positive or less negative or less positive, depending upon the particular application. Thus for example, if the incoming operation queue 265b1 has a maximum of 25 entries, the outgoing operation counter 264aI may be initialized to "25" for example to represent 25 credits. Each time a remote operation request of the associated resource type is sent to the remote processor complex, the credits may then be "decremented" by reducing the count of the counter until the counter 264a1 reaches "0" indicating that the credits have been used up. Similarly, the outgoing operation counter 264a1 may be initialized to "0" for example to represent the same 25 credits. Each time a remote operation request of the associated resource type is sent to the remote processor complex, the count of credits may then be "decremented" by increasing the count of the counter 264a1 until the counter 264a1 reaches "25" indicating that the credits have been used up.

The described implementations for resource management were described for use with systems deployed in a data environment where high availability is of value. However, those skilled in the art will appreciate that the resource management operations described herein may apply to computational and storage systems used for non-critical data.

In the described implementations, dual clusters were provided. In alternative implementations, there may be more than two clusters and resource management may be practiced in any of the other clusters.

The illustrated logic of FIGS. 4, 5 and 7 show certain events occurring in a certain order. In alternative implementations, certain operations may be performed in a different order, modified or removed. Morever, steps may be added to the above described logic and still conform to the described implementations. Further, operations described herein may occur sequentially or certain operations may be processed in parallel. Yet further, operations may be performed by a single processing unit or by distributed processing units.

The variable N is used to denote any integer variable for certain of the described elements and may indicate a same or different integer value when used in different instances.

Figure 1:
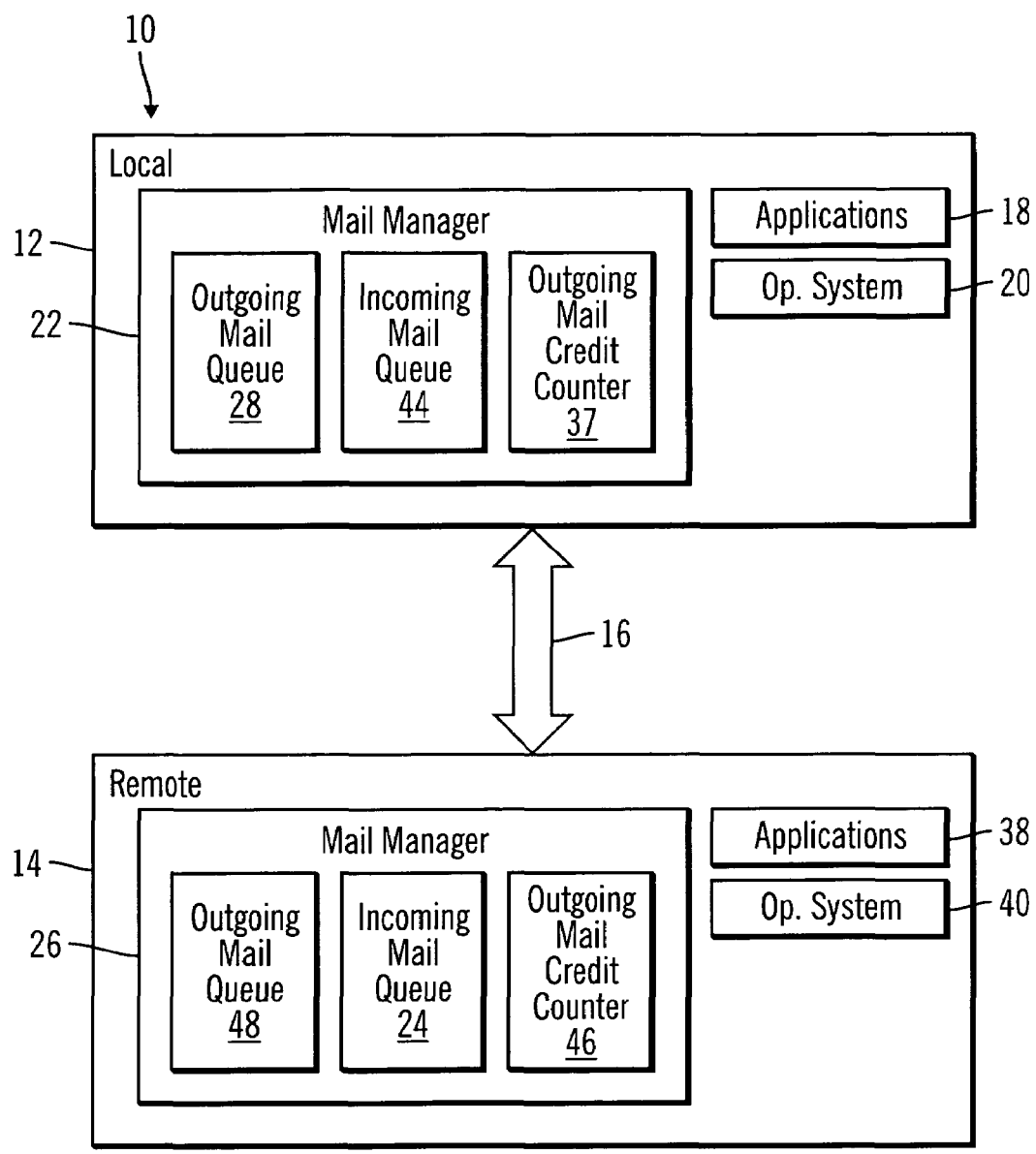
FIG. 1.1 illustrates a prior art mail manager for sending mail messages between processors.
Figure 8:
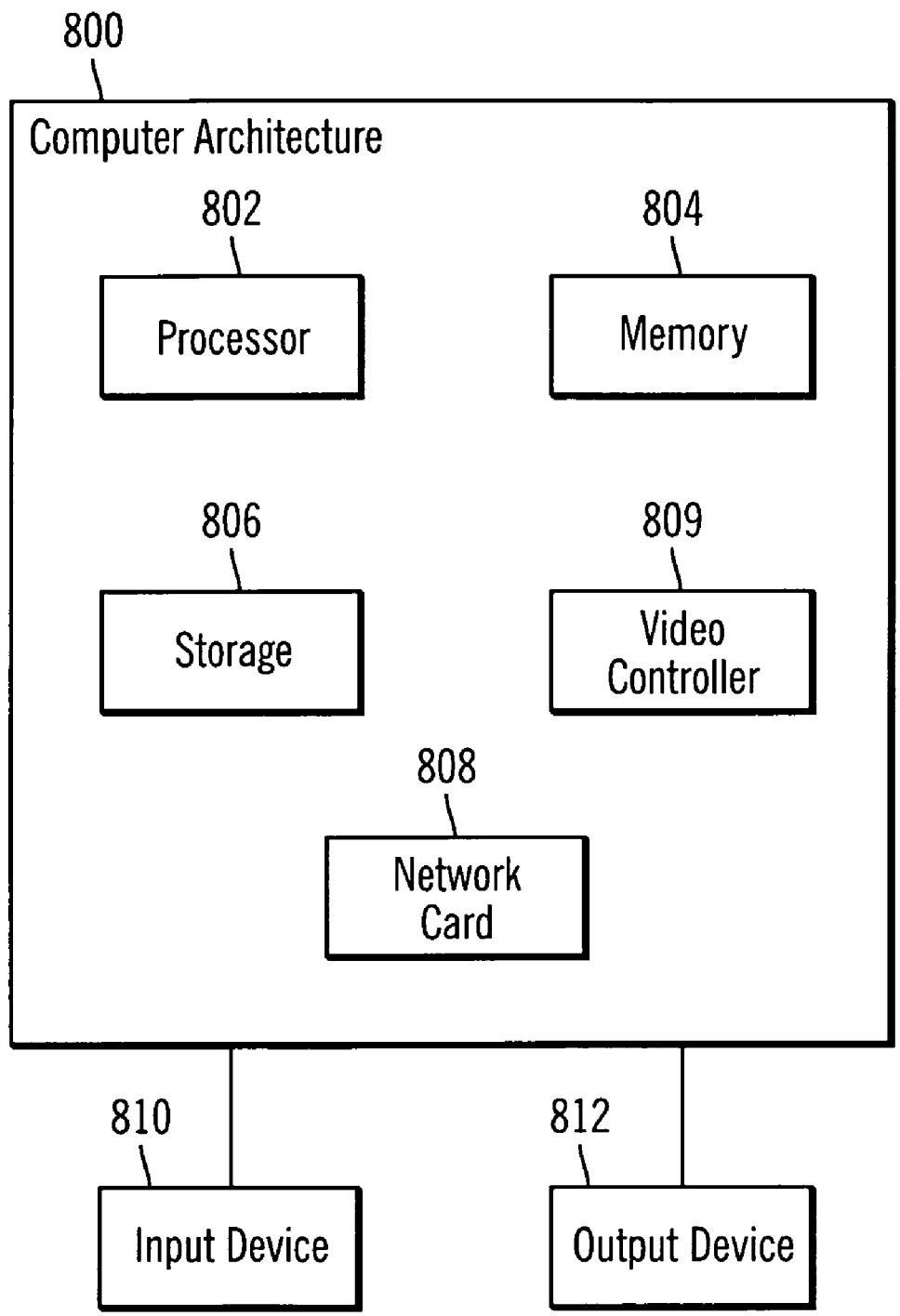
FIG. 8 illustrates an architecture of computing components in a network environment, such as the hosts, storage controllers, clusters, and any other computing devices.

FIG. 8 illustrates one implementation of a computer architecture 800 of the network components, such as the hosts and storage controller clusters shown in FIG. 1. The architecture 800 may include a processor 802 (e.g., a microprocessor), a memory 804 (e.g., a volatile memory device), and storage 806 (e.g., a non-volatile storage, such as magnetic disk drives, optical disk drives, a tape drive, etc.). The storage 806 may comprise an internal storage device or an attached or network accessible storage. Programs in the storage 806 are loaded into the memory 804 and executed by the processor 802 in a manner known in the art. The architecture further includes a network card 808 to enable communication with a network. An input device 810 is used to provide user input to the processor 802, and may include a keyboard, mouse, pen-stylus, microphone, touch sensitive display screen, or any other activation or input mechanism known in the art. An output device 812 is capable of rendering information transmitted from the processor 802, or other component, such as a display monitor, printer, storage, etc.

The foregoing description of various implementations of the invention has been presented for the purposes of illustration and description. It is not intended to be exhaustive or to limit the invention to the precise form disclosed. Many modifications and variations are possible in light of the above teaching. It is intended that the scope of the invention be limited not by this detailed description, but rather by the claims appended hereto. The above specification, examples and data provide a complete description of the manufacture and use of the composition of the invention. Since many embodiments of the invention can be made without departing from the spirit and scope of the invention, the invention resides in the claims hereinafter appended.

What is claimed is:

1. A method comprising:

adding a remote operation request of a first resource type sent to a remote processor from a local processor, as an entry in a first queue of remote operation requests of the first resource type awaiting execution in connection with a first resource in the remote processor;

adding a remote operation request of a second resource type sent to the remote processor from the local processor, as an entry in a second queue of remote operations of the second resource type awaiting execution by a second resource in the remote processor;

initiating execution of a remote operation request of the first resource type from the first queue using the resource of the first resource type of the remote processor;

initiating execution of a remote operation request of the second resource type from the second queue using the resource of the second resource type of the remote processor;

removing a remote operation request entry from the first queue;

removing a remote operation request entry from the second queue;

sending the local processor an acknowledgment that an additional remote operation request of the first resource type may be sent to the remote processor for execution;

sending the local processor an acknowledgment that an additional remote operation request of the second resource type may be sent to the remote processor for execution;

sending a remote operation request of a first resource type to the remote processor to be executed in connection with a first resource type of the remote processor;

decrementing a first count of credits for each remote operation of the first resource type sent to the remote processor wherein each credit of said first count indicates a permissible remote operation which is permitted to be sent to be executed in connection with an associated resource of the first resource type of the remote processor;

receiving an acknowledgment from the remote processor that another remote operation of the first resource type may be sent to the remote processor;

incrementing the first count of credits for each acknowledgment from the remote processor that another remote operation of the first resource type may be sent to the remote processor;

sending a remote operation request of a second resource type to the remote processor to be executed in connection with a second resource type of the remote processor;

decrementing a second count of credits for each remote operation of the second resource type sent to the remote processor wherein each credit of said second count indicates a permissible remote operation which is permitted to be sent to be executed in connection with an associated resource of the second resource type of the remote processor;

receiving an acknowledgment from the remote processor that another remote operation of the second resource type may be sent to the remote processor; and incrementing the second count of credits for each acknowledgment from the remote processor that another remote operation of the second resource type may be sent to the remote processor.

2. The method of claim 1 further comprising:

if the first count of credits is below a predetermined threshold, queuing a remote operation request of the first resource type in a third queue of remote operation requests of the first resource type awaiting to be sent to the remote processor to be executed in connection with the first resource type of the remote processor; and if the second count of credits is below a predetermined threshold, queuing a remote operation request of the second resource type in a fourth queue of remote operation requests of the second resource type awaiting to be sent to the remote processor to be executed in connection with the second resource type of the remote processor.

3. The method of claim 2 further comprising:

if the first count of credits is above a predetermined threshold, sending a remote operation request of the first resource type from the third queue to the remote processor to be executed in connection with the first resource type of the remote processor; and if the second count of credits is above a predetermined threshold, sending a remote operation request of the second resource type from the fourth queue to the remote processor to be executed in connection with the second resource type of the remote processor.

4. The method of claim 1 further comprising:

incrementing a third count of credits for each initiation of execution of a remote operation of the first resource type;

decrementing the third count of credits for each acknowledgment sent that an additional remote operation request of the first resource type may be sent to the remote processor for execution;

incrementing a fourth count of credits for each initiation of execution of a remote operation of the second resource type; and decrementing said fourth count of credits for each acknowledgment sent that an additional remote operation request of the second resource type may be sent to the remote processor for execution.

5. The method of claim 4 further comprising:

if the third count of credits is below a predetermined threshold, delaying sending the local processor an acknowledgment that an additional remote operation request of the first resource type may be sent to the remote processor for execution until the third count of credits is above a predetermined threshold; and if the fourth count of credits is below a predetermined threshold, delaying sending the local processor an acknowledgment that an additional remote operation request of the second resource type may be sent to the remote processor for execution until the fourth count of credits is above a predetermined threshold.

6. The method of claim 1 further comprising:

attaching an operation code identifying the resource type of a remote operation request prior to sending a remote operation request to the remote processor; and decoding the operation code of a remote operation request upon receipt of the remote operation request by the remote processor to identify the resource type.

7. The method of claim 1 wherein the first queue has a first maximum number of entries and said first count of credits has a first maximum which matches the first maximum number of entries of said first queue and the second queue has a second maximum number of entries and said second count of credits has a second maximum which matches the second maximum number of entries of said second queue.

8. A method comprising:

sending a remote operation request of a first resource type to a remote processor to be executed in connection with a first resource type of the remote processor;

decrementing a first count of credits for each remote operation of the first resource type sent to the remote processor wherein each credit of said first count indicates a permissible remote operation which is permitted to be sent to be executed in connection with an associated resource of the first resource type of the remote processor;

receiving an acknowledgment from the remote processor that another remote operation of the first resource type may be sent to the remote processor;

incrementing the first count of credits for each acknowledgment from the remote processor that another remote operation of the first resource type may be sent to the remote processor;

sending a remote operation request of a second resource type to the remote processor to be executed in connection with a second resource type of the remote processor;

decrementing a second count of credits for each remote operation of the second resource type sent to the remote processor wherein each credit of said second count indicates a permissible remote operation which is permitted to be sent to be executed in connection with an associated resource of the second resource type of the remote processor;

receiving an acknowledgment from the remote processor that another remote operation of the second resource type may be sent to the remote processor;

incrementing the second count of credits for each acknowledgment from the remote processor that another remote operation of the second resource type may be sent to the remote processor;

if the first count of credits is below a predetermined threshold, queuing a remote operation request of the first resource type in a first queue of remote operation requests of the first resource type awaiting being sent to the remote processor to be executed in connection with the first resource type of the remote processor;

if the second count of credits is below a predetermined threshold, queuing a remote operation request of the second resource type in a second queue of remote operation requests of the second resource type awaiting being sent to the remote processor to be executed in connection with the second resource type of the remote processor;

if the first count of credits is above a predetermined threshold, sending a remote operation request of the first resource type from the first queue to the remote processor to be executed in connection with the first resource type of the remote processor; and if the second count of credits is above a predetermined threshold, sending a remote operation request of the second resource type from the second queue to the remote processor to be executed in connection with the second resource type of the remote processor.

* * * * *